US008321375B2

(12) United States Patent
Nomura (10) Patent No.: US 8,321,375 B2
(45) Date of Patent: Nov. 27, 2012

(54) SEARCH DATA UPDATE METHOD AND SEARCH DATA UPDATE SYSTEM (75) Inventor: Takashi Nomura, Zama (JP)

(73) Assignee: Xanavi Informatics Corporation, Zama-shi (JP)

(*) Notice: Subject to any disclaimer, the term of this patent is extended or adjusted under 35 U.S.C. 154(b) by 306 days.

(21) Appl. No.: 10/586,534

(22) PCT Filed: Jan. 19, 2005

(86) PCT No.: PCT/JP2005/000597
§ 371 (c)(1),
(2), (4) Date: Jul. 19, 2006

(87) PCT Pub. No.: WO2005/069147
PCT Pub. Date: Jul. 28, 2005

(65) Prior Publication Data
US 2008/0228712 A1 Sep. 18, 2008

(30) Foreign Application Priority Data
Jan. 20, 2004 (JP) ................. 2004-012034

(51) Int. Cl.
G06F 17/30 (2006.01)
(52) U.S. Cl. ......... 707/616; 707/612; 707/621; 707/641
(58) Field of Classification Search .......... 707/1–5, 707/7, 9, 10, 100–104, 200, 203, 999.1–5, 707/609, 616, 621, 641; 701/208, 209
See application file for complete search history.

(56) References Cited

U.S. PATENT DOCUMENTS

| 4,611,272 | A | * | 9/1986 | Lomet | 1/1 |
| 5,204,958 | A | * | 4/1993 | Cheng et al. | 1/1 |
| 6,081,803 | A | * | 6/2000 | Ashby et al. | 707/4 |
| 6,477,461 | B2 | | 11/2002 | Tanaka et al. | |

(Continued)

FOREIGN PATENT DOCUMENTS
JP 7-56945 A 3/1995
(Continued)

OTHER PUBLICATIONS

English Translation of International Search Report dated Mar. 15, 2005 (Two (2) pages).

(Continued)

Primary Examiner — Son T Hoang
Assistant Examiner — Yu Zhao
(74) Attorney, Agent, or Firm — Crowell & Moring LLP (57) ABSTRACT A search data update system includes a navigation apparatus that uses search data and a data providing center that provides update data for updating the search data to the navigation apparatus. The navigation apparatus reads a search data main body constituted with search tree data and a plurality of sets of substance data each specified based upon the search tree data from a recording medium. The data providing center provides the update data to be used to update the search data to the navigation apparatus. The update data are provided in units of individual sets of substance data and include attached thereto information to be used in a search in correspondence to each set of substance data. Upon obtaining the update data from the data providing center, the navigation apparatus stores the obtained update data into a nonvolatile memory separately from the search data main body.

11 Claims, 10 Drawing Sheets

U.S. PATENT DOCUMENTS

| | | | |
|---|---|---|---|
| 6,980,907 B2 * | 12/2005 | Umezu et al. | 701/210 |
| 2002/0013657 A1 | 1/2002 | Narioka et al. | |
| 2002/0013658 A1 * | 1/2002 | Tanaka et al. | 701/209 |
| 2002/0052894 A1 * | 5/2002 | Bourdoncle et al. | 707/513 |
| 2003/0028316 A1 * | 2/2003 | Miyahara | 701/208 |
| 2003/0140309 A1 * | 7/2003 | Saito et al. | 715/500 |
| 2003/0231163 A1 * | 12/2003 | Hanon et al. | 345/156 |
| 2005/0203937 A1 | 9/2005 | Nomura | |

FOREIGN PATENT DOCUMENTS

| | | |
|---|---|---|
| JP | 11-295084 A | 10/1999 |
| JP | 2001-56823 A | 2/2001 |
| JP | 2002-107170 A | 4/2002 |
| JP | 2002-333322 A | 11/2002 |
| JP | 2003-42771 A | 2/2003 |
| JP | 2003-315062 A | 11/2003 |
| JP | 2003-337026 A | 11/2003 |
| JP | 2003-337027 A | 11/2003 |
| WO | WO 03/098578 A1 | 11/2003 |

OTHER PUBLICATIONS

English translation of German Office Action dated Apr. 5, 2007 (Five (5) pages).

German Office Action dated Jan. 28, 2009 with English translation (eight (8) pages).

* cited by examiner

| NON-TARGET FLAG | INDEX | CATEGORY CODE | SUBSTANCE NAME | DATA VERSION |
|---|---|---|---|---|
| 0 or 1 | AIUOO SEIZO | 015Ah | AIUOO SEIZO CO. LTD. | 20031106 |

(b)

| INDEX | CATEGORY CODE | SUBSTANCE NAME | DATA VERSION |
|---|---|---|---|
| AIUEO SEIZO | 015Ah | AIUEO SEIZO CO. LTD. | 20031211 |

| INDEX | CATEGORY CODE | SUBSTANCE NAME | DATA VERSION |
|---|---|---|---|
| KAIUEO SEISAKUSYO | 015Ah | KAIUEO SEISAKUSYO CO. LTD. | 20031211 |

(c)

| NON-TARGET FLAG | INDEX | CATEGORY CODE | SUBSTANCE NAME | DATA VERSION |
|---|---|---|---|---|
| 0 or 1 | AIUEO SEIZO | 015Ah | AIUEO SEIZO CO. LTD. | 20031211 |
| 0 or 1 | AIUOO SEIZO | 015Ah | AIUOO SEIZO CO. LTD. | 20031106 |
| 0 or 1 | KAIUEO SEISAKUSYO | 015Ah | KAIUEO SEISAKUSYO CO. LTD. | 20031211 |

: UPDATED NUMBERS

FIG. 11

☐ : UPDATED AREAS

| GUNMA PREFECTURE | AIKAWA TOWN | ATSUGI CITY | AYASE CITY | | |
| --- | --- | --- | --- | --- | --- |
| SAITAMA PREFECTURE | ISEHARA CITY | EBINA CITY | OISO TOWN | | |
| CHIBA PREFECTURE | OI TOWN | ODAWARA CITY | KAISEI TOWN | | |
| | KAMAKURA CITY | | | | |
| TOKYO | ASO WARD, KAWASAKI CITY | | | | |
| | KAWASAKI WARD, KAWASAKI CITY | | | | |
| | SAIWAI WARD, KAWASAKI CITY | | | | |
| | TAKATSU WARD, KAWASAKI CITY | | | | |
| | TAMA WARD, KAWASAKI CITY | | | | |
| | NAKAHARA WARD, KAWASAKI CITY | | | | |
| | MIYAMAE WARD, KAWASAKI CITY | | | | |
| KANAGAWA PREFECTURE | KIYOKAWA VILLAGE | SAGAMIKO TOWN | SAGAMIHARA CITY | | |
| | SAMUKAWA TOWN | ZAMA CITY | SHIROYAMA TOWN | | |
| NIIGATA PREFECTURE | ZUSHI CITY | | | | |
| TOYAMA PREFECTURE | .. | | | | |
| .. | | | | | |

SEARCH DATA UPDATE METHOD AND SEARCH DATA UPDATE SYSTEM

TECHNICAL FIELD

The present invention relates to a method and system adopted to update search data used in a navigation apparatus.

BACKGROUND ART

There are technologies known in the related art for updating map data used in car navigation apparatuses by dividing a map into a plurality of units, creating map data files in correspondence to the individual units and individually updating the map data files (see, for instance, patent reference literature 1). There are also technologies in the related art which are adopted in map information services provided through computer communication, whereby only map data that are needed are transmitted to a map data display terminal without transmitting any map data already present in a display memory at the map data display terminal (see, for instance, patent reference literature 2).
Patent reference literature 1: Japanese Laid Open Patent Publication No. 2001-56823
Patent reference literature 2: Japanese Laid Open Patent Publication No. H11-295084

DISCLOSURE OF THE INVENTION

Problems to be Solved by the Invention

However, these technologies relate to map data update, and are not designed for updating search data used in navigation apparatuses. Search data provided through communication or the like as are the map data, also need to be updated efficiently.
The present invention provides a method and a system to be adopted to efficiently update search data used in a navigation apparatus.

Means for Solving the Problems

According to the 1st aspect of the invention, an update method for updating search data used in a navigation apparatus, comprises: providing data constituted with search tree data and a plurality of sets of substance data specified based upon the search tree data, as search data prior to an update; and providing a set of substance data having search-related information separately from the data constituted with the search tree data and the plurality of sets of substance data specified based upon the search tree data, when updating a set of substance data in the search data or adding a set of substance data to the search data.
According to the 2nd aspect of the invention, in the update method for updating search data used in a navigation apparatus according to the 1st aspect, it is preferred that the update method further comprises storing the provided set of substance data having search-related information as update data in the navigation apparatus separately from the search tree data and the plurality of sets of substance data specified based upon the search tree data.
According to the 3rd aspect of the invention, a search data update system comprises: a navigation apparatus that uses search data; and a search data providing apparatus that provides update data to be used to update the search data to the navigation apparatus, and: the navigation apparatus includes a first storage device at which first search data constituted with search tree data and a plurality of sets of substance data each specified based upon the search tree data are stored, a second storage device and an update data obtaining device that obtains the update data to be used to update the search data from the search data providing apparatus; the update data are provided in units of individual sets of substance data and include attached thereto information to be used in a search in correspondence to each set of substance data; upon obtaining the update data from the search data providing apparatus, the update data obtaining device stores the obtained update data into the second storage device separately from the first search data; and the navigation apparatus further includes a search device that executes a substance data search by using the first search data stored in the first storage device and the update data stored in the second storage device.
According to the 4th aspect of the invention, in the search data update system according to the 3rd aspect, it is preferred that upon obtaining new update data, the update data obtaining device in the navigation apparatus sorts entire update data including the new update data and the update data already stored in the second storage device based upon the information to be used in a search and stores the sorted update data in the second storage device.
According to the 5th aspect of the invention, in the search data update system according to the 3rd or the 4th aspect, it is preferred that the navigation apparatus further includes a control device that executes navigation processing including route search and route guidance by using the substance data obtained via the search device.
According to the 6th aspect of the invention, in the search data update system according to any of the 3rd through 5th aspects, it is preferred that once a number of sets of update data having been obtained becomes equal to or greater than a predetermined value, the update data obtaining device in the navigation apparatus provides an audio output or a display output notifying that the number of sets of update data is equal to or greater than the predetermined value.
According to the 7th aspect of the invention, in the search data update system according to any of the 3rd through 5th aspects, it is preferred that once a number of sets of update data having been obtained becomes equal to or greater than a predetermined value, the update data obtaining device in the navigation apparatus obtains a new version of first search data constituted with new search tree data and a plurality of sets of substance data containing substance data in the update data each specified based upon the new search tree data and stores the new version of first search data thus obtained into the first storage device.
According to the 8th aspect of the invention, in the search data update system according to the 5th aspect, it is preferred that: the navigation apparatus further includes an input device with which a search key can be entered one character at a time; and in correspondence to each character entered via the input device, the search device advances a search executed by using the search tree in the first search data, also compares the character with the information to be used in a search, which is contained in each of a plurality of sets of update data stored in the second storage device, and attaches a non-target index to each set of update data determined not to be a search target based upon comparison results.
According to the 9th aspect of the invention, in the search data update system according to any of the 3rd through 8th aspects, it is preferred that: the update data obtaining device in the navigation apparatus transmits to the search data providing apparatus information indicating a range of search data to be updated; and if update data are available over the range of search data to be updated indicated in the received information, the search data providing apparatus provides the update data over the range to the navigation apparatus.

According to the 10th aspect of the invention, in the search data update system according to any of the 3rd through 9th aspects, it is preferred that: the update data obtaining device in the navigation apparatus transmits to the search data providing apparatus information related to a version of the update data stored in the second storage device; and if a newer version of substance data than the version indicated in the received information is available, the search data providing apparatus provides the update data corresponding to the newer version of the substance data to the navigation apparatus.

According to the 11th aspect of the invention, a navigation apparatus is the navigation apparatus in a search data update system according to any of the 3rd through 10th aspects.

According to the 12th aspect of the invention, a search data providing apparatus is the search data providing apparatus in a search data update system according to any of the 3rd through 10th aspects.

Effect of the Invention

The present invention structured as described above achieves the following advantages.

Since update data, each set of which is provided in correspondence to a specific set of substance data, are obtained and saved separately from search data constituted with search tree data and a plurality of sets of substance data each specified based upon the search tree data, the volume of the update data can be minimized. In addition, the latest version of search data can be provided for use. In particular, when such update data are provided through communication, the communication cost is significantly reduced since a large volume of data does not need to be transmitted.

BRIEF DESCRIPTION OF THE DRAWINGS

FIG. 12 shows how the program may be provided to a personal computer in a recording medium such as a CD-ROM or via a data signal on the Internet or the like.

BEST MODE FOR CARRYING OUT THE INVENTION

Figure 1:
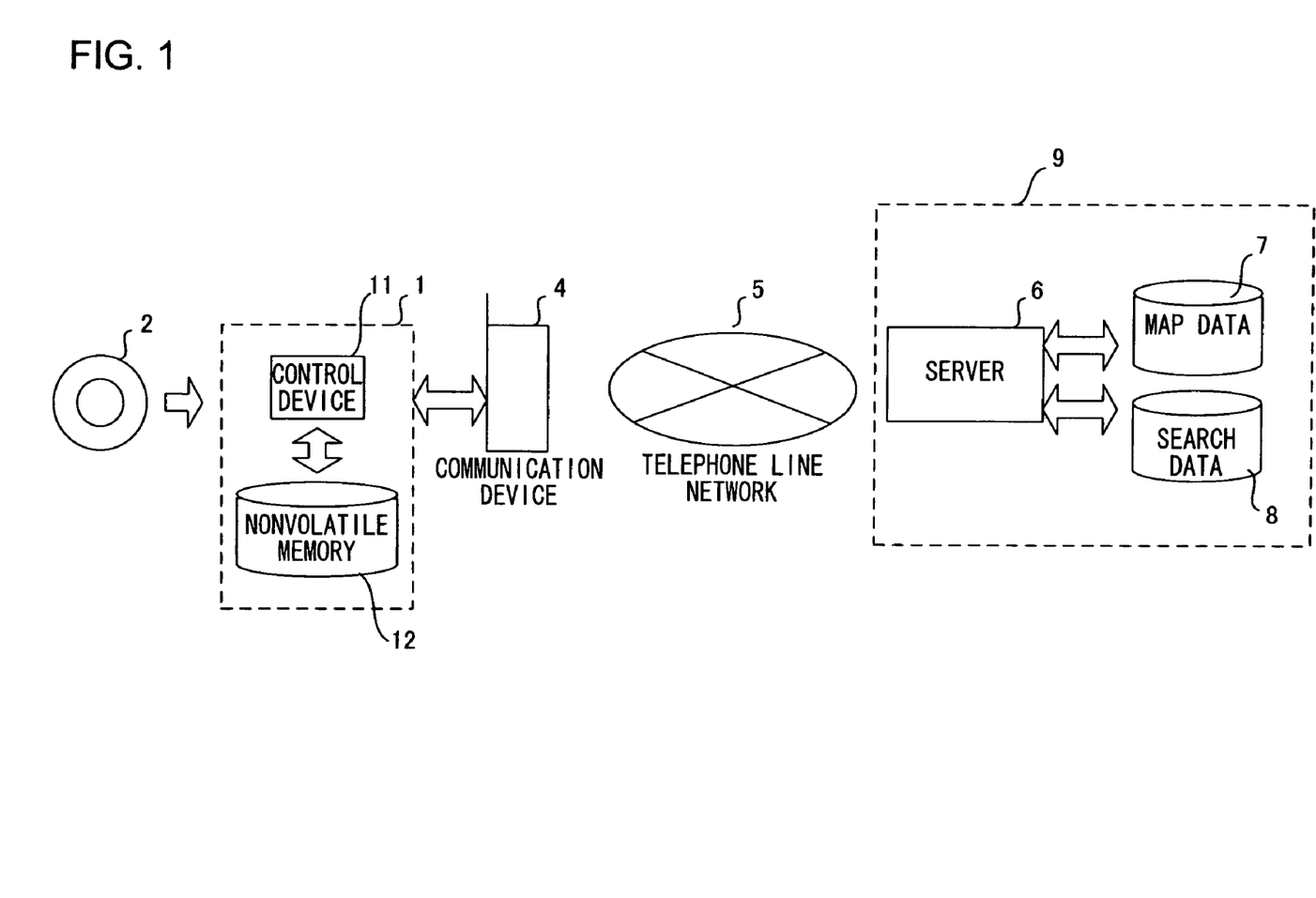
FIG. 1 shows a search data update system for updating search data used in a navigation apparatus, achieved in an embodiment of the present invention.

FIG. 1 shows the search data update-system for updating search data used for navigation apparatuses, as achieved in an embodiment. An on-vehicle navigation apparatus 1 reads map data, search data (guidance search data) and the like from a recording medium 2 which may be a CD-ROM or a DVD-ROM. A server 6 at a data providing center 9 reads map data or search data from a map database 7 or a search database 8 and provides update data to be used to update map data or search data to the navigation apparatus.

The navigation apparatus 1 has a connecting capability that enables it to connect with a communication device 4 such as a portable telephone. The navigation apparatus 4 can connect with a telephone line network 5 via the communication device 4 and can further connect with the server 6 via the telephone line network 5. At the server 6, map data including older versions and the latest version thereof are held in the map database 7 and search data including older versions and the latest version thereof are held in the search database 8. Accordingly, the server 6 is able to provide update data to be used to update part of the map data or the search data to the navigation system 1 via the telephone line network 5.

The navigation apparatus 1 includes a control device 11 and a nonvolatile memory 12. The control device 11 is constituted with a microprocessor and its peripheral circuits. The nonvolatile memory 12 may be an internal hard disk or an internal flash memory installed in the navigation apparatus 1. No particular limitations are imposed with regard to the type of nonvolatile memory 12, as long as it is a storage device that retains the data written therein when the power to the navigation system 1 is turned off.

The map database 7 and the search database 8 at the data providing center 9, which hold all versions of the map data and the search data, i.e., the older versions and the latest version thereof, are mother databases. The server 6 is also capable of preparing a recording medium 2 having recorded therein initial (pre-update) map data or search data by using the data in the map database 7 or the search database 8.

Figure 2:
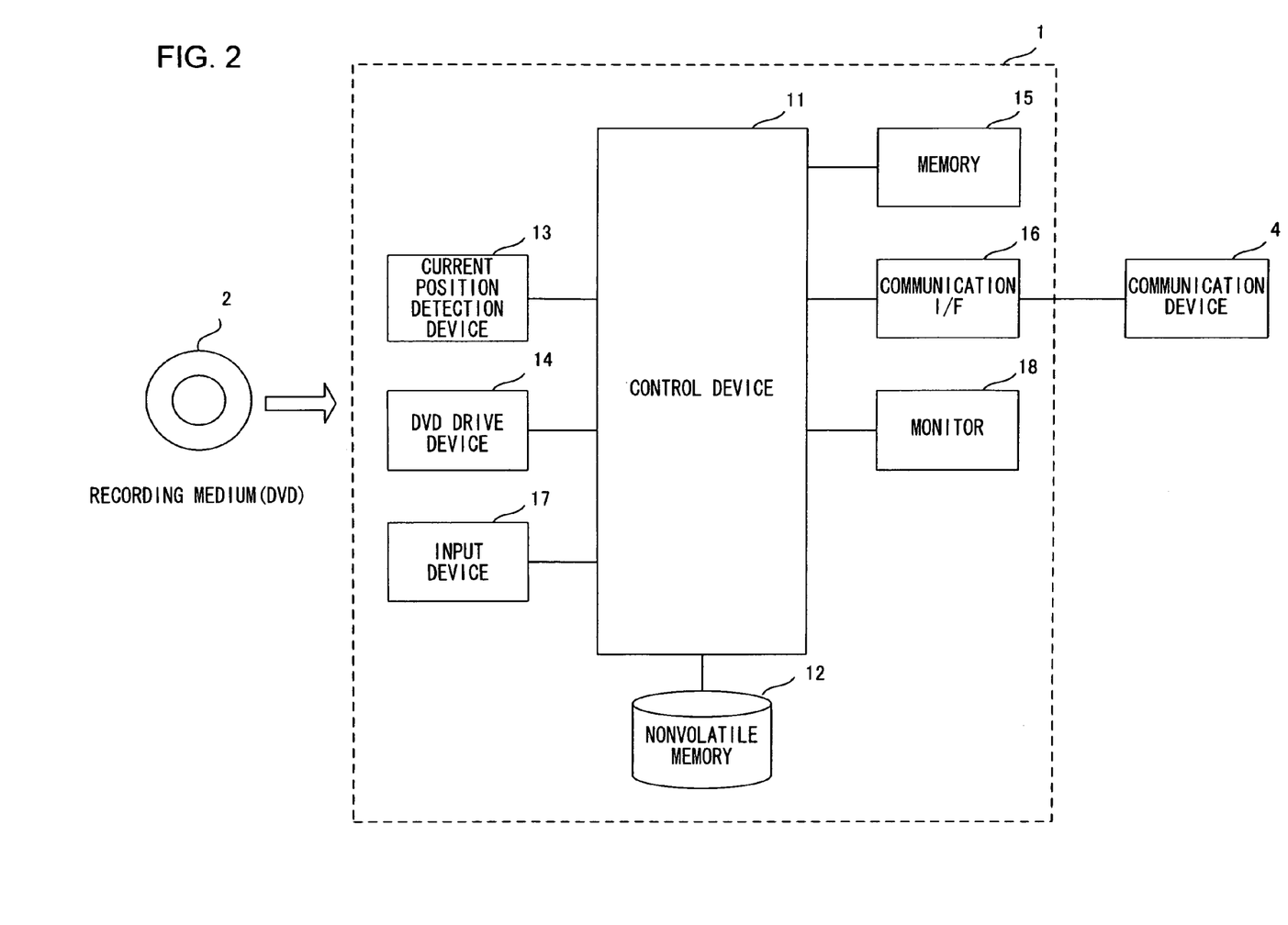
FIG. 2 is a block diagram of the on-vehicle navigation apparatus.

FIG. 2 is a block diagram of the on-vehicle navigation apparatus 1. The navigation apparatus 1 comprises the control device 11, the nonvolatile memory 12, a current position detection device 13, a DVD drive device 14, a memory 15, a communication interface 16, an input device 17, a monitor 18 and the like.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal from a GPS (global positioning system) satellite and the like. The DVD drive device 14 reads the map data and the like from the recording medium 2 loaded therein. The recording medium 2 in the embodiment is a DVD-ROM. However, the recording medium may be a CD-ROM or another type of recording medium.

In the memory 15, vehicle position information detected via the current position detection device 13 and the like are stored. In addition, node information, link information and the like with regard to the nodes and the links present on a recommended route determined through an arithmetic operation executed by the control device 11 are also stored in the memory 15. The memory 15 is used as a working area by the control device 11. The communication device 4 is connected via the communication interface 16. The use of a portable telephone and an Internet connection are enabled via the communication interface 16.

The monitor 18 is a display device at which a map, the recommended route and various types of information are displayed. The monitor 18 may be an integrated part of the navigation apparatus main unit, or it may be installed in a separate frame. Alternatively, the monitor 18 may be a standalone unit installed at a remote position and connected with the navigation apparatus main unit through a cable or the like. Through the input device 17, a destination for the vehicle and the like are input when executing a route search. It is also used to enter a search key. It may be a remote-control unit, or it may be a touch panel or the like mounted on the screen of the monitor 18.

The control device 11 executes various types of navigation processing, such as road map display, route calculation (route search) and route guidance, based upon the current vehicle position detected by the current position detection device 13 and the map data and the search data stored in the recording medium 2 and the non-volatile memory 12. It is to be noted that processing programs based upon which the control device 11 executes the various types of processing are installed in a ROM (not shown) in the control device 11.

The server 6 at the data providing center 9 is constituted with a computer system that executes various types of processing, such as providing update data, by using the map database 7 and the search database 8. Any of various types of computers including general-purpose computers, workstations and personal computers may be used to constitute the computer system Next, the map data and the search data used in the navigation apparatus 1 are explained.

—Map Data—

The map data are information related to maps and include background (map display) data, road (locator) data, route search (network) data and route guidance data (information indicating intersection names, road names and directional terms, directional guidance facility information and the like). The background data are used to display a background of a road or a background in a road map. The road data are used to specify the vehicle position (current position) on a road for map matching and the like. The route search data, which are data constituted with branching information and the like not directly relevant to the specific road shapes, are mainly used when calculating a recommended route (when executing a route search). The route guidance data include the names of intersections and the like, and are used to provide guidance for the driver or the like along the recommended route having been calculated.

The road data (locator data) are link string data that express roads with, for instance, links, nodes and link strings. A node may be an intersection or a special point specified on a road. A link is equivalent to a road portion connecting nodes, whereas a link string is a string of a plurality of links representing a single road. The details of the link string data are of the known art. The background data may be, for instance, polygon or poly line data. Roads are displayed by using poly-line data or the like.

—Search Data—

The search data are used to determine a specific geographical point through a search instead of by selecting the desired geographical point on a map. For instance, the search data are used in a route search to determine the position of the destination facility by entering the name, the telephone number, the street address or the like of the facility. The control device 11 executes processing such as the route search to determine a route to the destination set at the geographical point thus determined by using the search data.

The search data include name (phonetic) search data, telephone number search data and street address search data. The name search data are used to identify a specific position on the map based upon the name of a facility present thereat, and data files for each category (genre) are created each in correspondence to one of the prefectures. The categories include, for instance, "train stations", "airports", "ferries", "department stores" and "hotels". Each file contains search tree data used for name-based search and substance data.

The telephone number search data are used to locate a position on the map based upon the telephone number, and data files are prepared each in correspondence to numerals in the first two digits of an area code. Each file contains search tree data used for telephone number-based search and substance data. The street address search data are used to locate a position on the map in correspondence to the street address, and data files are prepared each in correspondence to a local municipality in a prefecture. Each file contains search tree data and used for street address-based search and substance data. The individual types of search data include facility name information indicating the names of various facilities, telephone number information, street address information and position information as the substance data. It is to be noted that the position information included in the search data is positional coordinate data indicating the positional coordinates determined based upon latitude/longitude.

—Updating Search Data—

Figure 3:
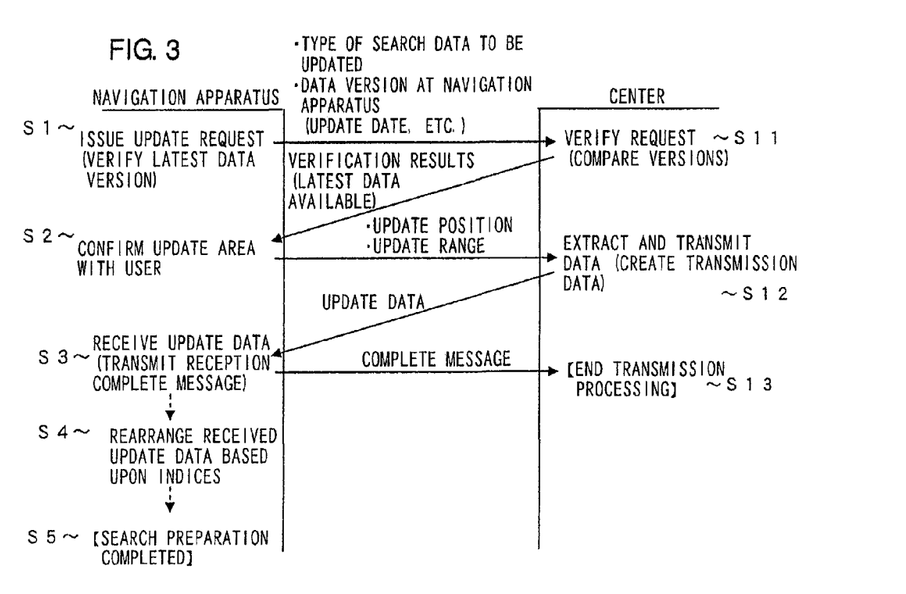
FIG. 3 shows how information related to search data update is exchanged between the navigation apparatus and the data providing center.

Next, the update of the search data, which characterizes the present invention, is explained. FIG. 3 shows how information is exchanged between the navigation apparatus 1 and the data providing center 9 during a search data update. The processing at the navigation apparatus 1 is executed by the control device 11 based upon a specific program, whereas the processing at the data providing center 9 is executed by the server 6 based upon a specific program.

The processing at the navigation apparatus 1 in FIG. 3 starts as an "update search data" menu is selected in a menu screen or the like at the navigation apparatus 1. It is assumed that the specific type of search data to be updated is selected in advance. In selection of a type of search data to be updated, a data type selection screen is brought up on display at the monitor 18. Then, the operation waits for the user to select a specific type of data for an update via the input device 17. The data type selection screen may include options such as "name search data", "telephone number search data" and "street address search data" so as to allow the user to select one of the options. In response to the selection operation performed by the user, the data type is identified (or selected).

In step S1, the control device 11 at the navigation apparatus 1 first executes control on the portable telephone constituting the communication device 4 via the communication interface 16 so as to call the data providing center 9 at a designated telephone number. Once the call is connected, an update request is transmitted. The update request is issued by transmitting information indicating the type of search data to the updated and version information (the version, the update date, the data creation date and the like) with regard to the search data currently stored in the navigation apparatus 1. The search data version information is obtained by the control device 11 by checking the latest version of the search data stored in the recording medium 2 and the nonvolatile memory 12. It is to be noted that the version information corresponding to the original data in the recording medium 2 and the version information corresponding to all the update data are transmitted in the embodiment. In addition, the communication between the navigation apparatus 1 and the data providing center 9 is enabled by using a digital data communication function of the portable telephone.

In step S111, the server 6 at the data providing center 9 verifies the request having been transmitted thereto. More specifically, based upon the information indicating the type of search data to be updated and the version information, both having been transmitted thereto, the server accesses the search database 8 and ascertains whether or not a new version of search data (substance data) is available. Subsequently, it transmits the verification results to the navigation apparatus 1.

Upon receiving the verification results indicating that a more recent version of the data is available, the control device 11 at the navigation apparatus 1 confirms an update area with the user. More specifically, it outputs a message "Specify search data update area" as an audio message or as a text message on the monitor 18. At the monitor 18, a map with a cursor is brought up on display. Thus, the user is able to move the cursor onto a desired area (geographical point) by scrolling the map screen up/down and left/right via the input device 17. Once the cursor is set at the desired area (geographical point), the user operates an OK button to specify the update area (geographical point/position). The control device 11 at the navigation apparatus 1 then transmits information indicating the specified update area (geographical point) and the update range to the data providing center 9.

The update range is a predetermined range covering a 10 km-radius range around the specified area for example. Alternatively, the update range may be adjusted in correspondence to the display level or the map display scaling factor of the map on display when the update area is specified. It is to be noted that if the verification results indicate that no newer version of the data is available, the processing ends in step S2.

In step S12, the server 6 at the data providing center 9 extracts update data and transmits the extracted data to the navigation apparatus 1. More specifically, based upon the type of search data to be updated indicated in the information having been received in step S11 and the update position and the update range indicated in the information having been transmitted thereto most recently, the server 6 accesses the search database 8 and extracts the update data. The update data are extracted only if a version of the data newer than the version of the search data held at the navigation apparatus 1 is available at the search database 8.

Figure 4:
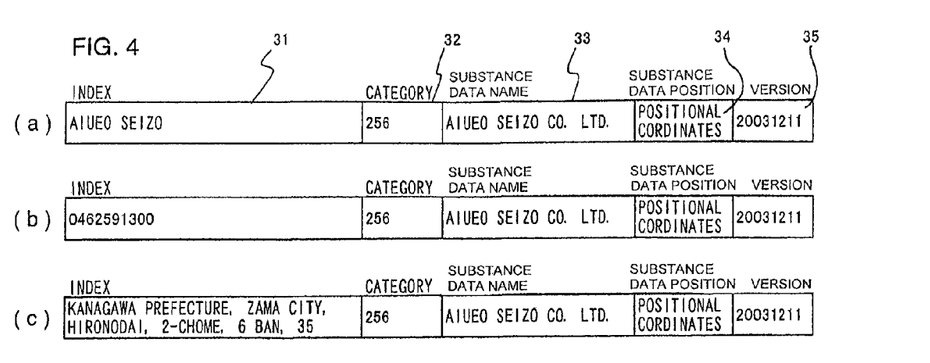
FIG. 4 shows the data format (structure) of the update data transmitted from the server to the navigation apparatus, to be used to update search data.

FIG. 4 shows the data format (structure) of update data transmitted by the server 6 to the navigation apparatus 1 to be used to update search data. FIG. 4(*a*) shows the data format of the update data for name search data, FIG. 4(*b*) shows the data format of the update data for telephone number search data and FIG. 4(*c*) shows the data format of the update data for street address search data. Each set of update data includes information indicating an index 31, a category 32, a substance data name 33, a substance data position 34 and a version 35.

The search data recorded in the recording medium 2 are constituted with search tree data and a plurality of sets of substance data (name information, telephone number information, street address information and position information). Update data, however, are generated in correspondence to each set of substance data by adding an index to be used as a search key to the substance data. If there is a single set of substance data to be updated, one set of update data formatted as shown in FIG. 4 is transmitted. If a plurality of sets of substance data are to be updated, a plurality of sets of update data formatted as shown in FIG. 4 are transmitted. In other words, the update data are not transmitted in a format that will include a search tree and substance data.

In step S3, the control device at the navigation system receives the update data and transmits a reception complete message to the data providing center 9. In step S13, the server 6 at the data providing center 9 receives the reception complete message and, upon receiving the reception complete message, ends the transmission processing.

The control device 11 at the navigation apparatus 1 rearranges the update data received in step S3 and the update data having been previously received and stored in the non-volatile memory 12, in accordance with their indices. In other words, the control device sorts the update data. The sorted update data are recorded back into the non-volatile memory 12.

Figure 5:
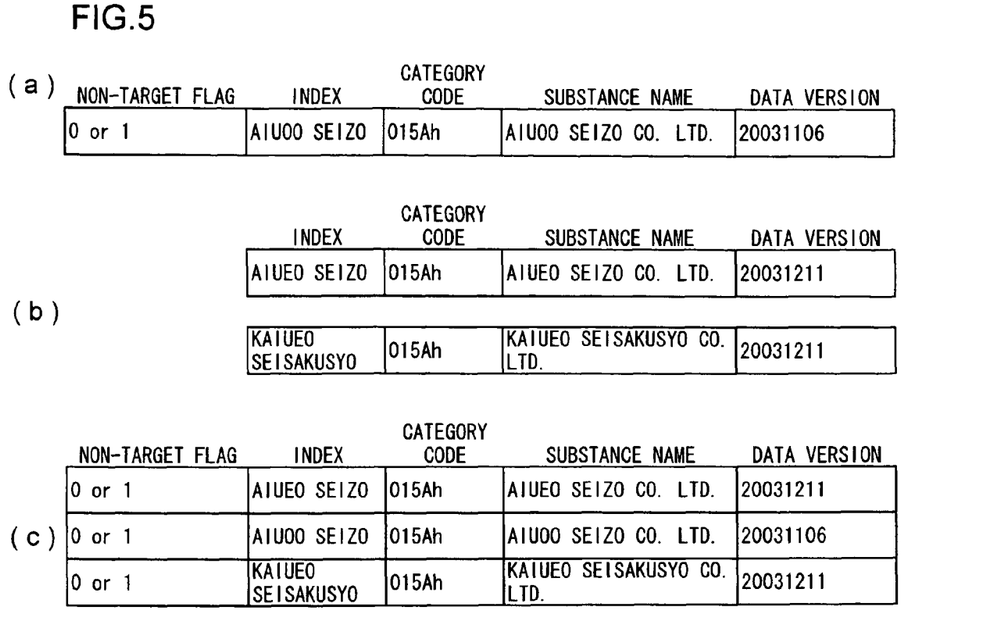
FIG. 5 illustrates how the update data are rearranged.

FIG. 5 illustrates how the update data are rearranged. FIG. 5(*a*) shows the update data already stored in the nonvolatile memory 12. One set of update data is stored in the nonvolatile memory in this example. FIG. 5(*b*) shows new update data to be added. FIG. 5(*c*) shows update data that include the update data having been already recorded and the newly added update data, rearranged by sorting them in alphabetical order. The sorted update data in FIG. 5(*c*) are stored back into the nonvolatile memory 12. It is to be noted that the non-target flag set in the update data recorded in the nonvolatile memory 12 is to be described in detail later.

—Search Processing—

Figure 6:
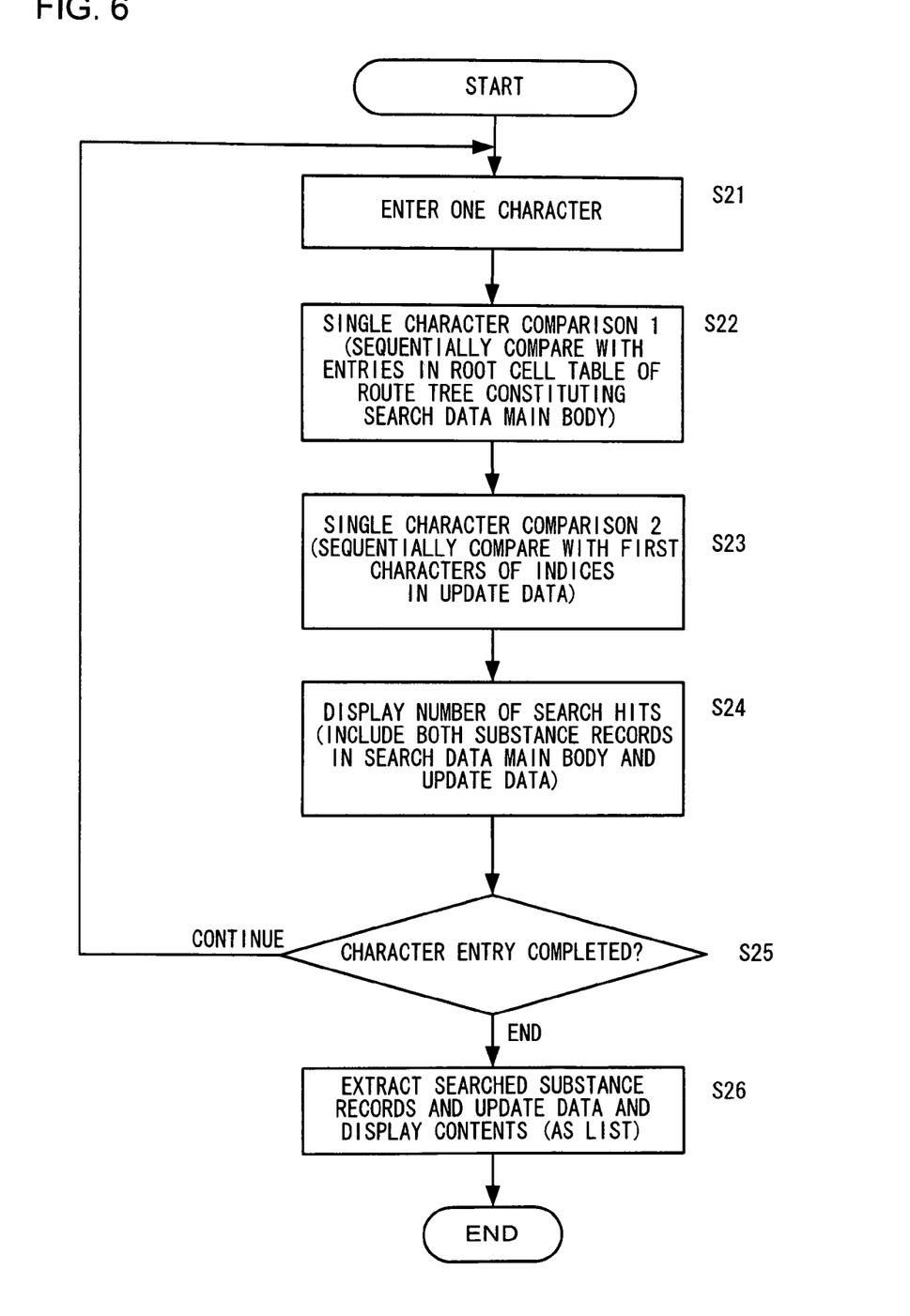
FIG. 6 presents a flowchart of the search processing executed in the navigation apparatus.

FIG. 6 presents a flowchart of the search processing executed in the navigation apparatus 1. The processing in FIG. 6 is executed for the name search data. The user enters characters one at a time via the input device 17 and a facility bearing the name matching the spelling is searched.

In step S21, the control device 11 obtains a character having been entered by the user via the input device 17. In step S22, comparison processing is executed for the character having been input by using the search data. Namely, comparison processing is executed for the character by using the search tree in the search data recorded in the recording medium 2. It is to be noted that data in the recording medium 2 are first read into the memory 15 and the comparison processing and the like are executed by using the data in the memory 15. It is to be noted that the data in the recording medium 2 may instead be read out into the nonvolatile memory 12 and then the data may be read from the nonvolatile memory 12 into the memory 15.

Figure 7:
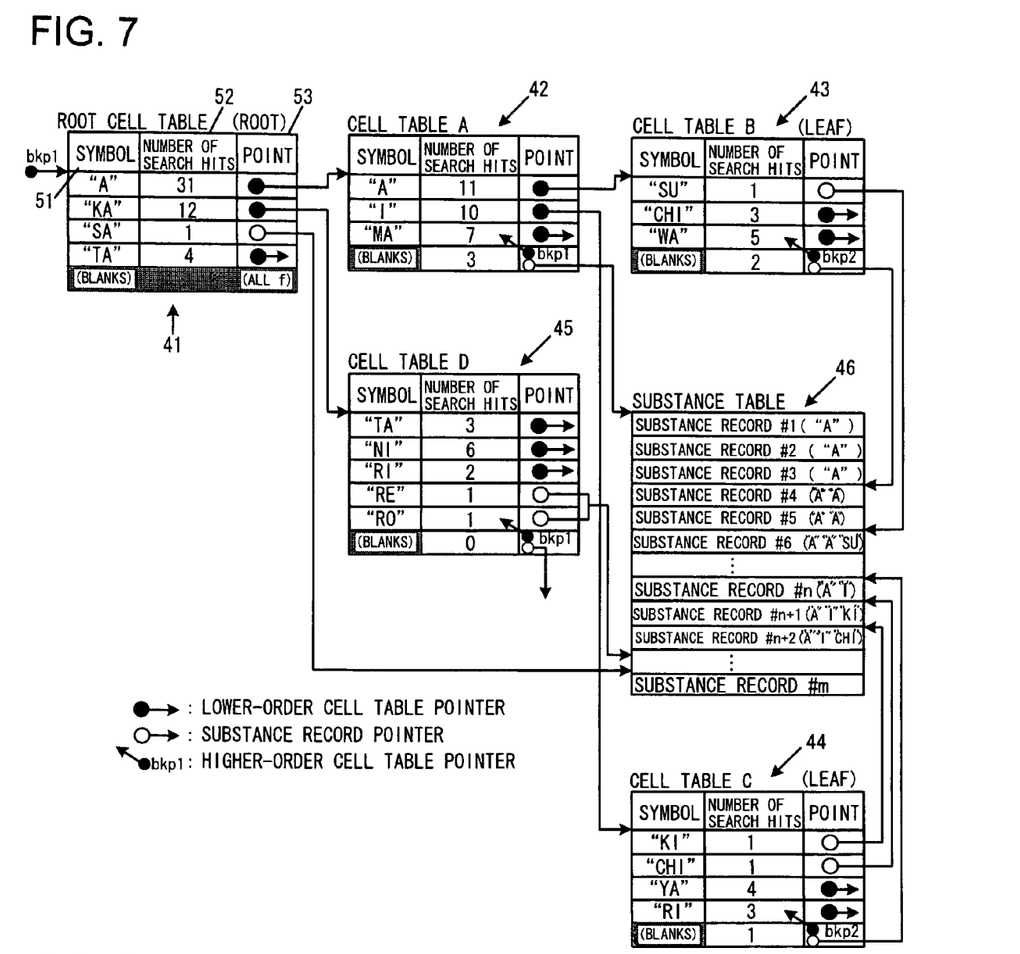
FIG. 7 shows the comparison processing executed by using the search tree in the name search data.

The comparison processing executed by using the search trees in the name search data may be better understood by referring to FIG. 7. A search tree is constituted with a single root cell table 41 and a plurality of cell tables 42 through 44.

The root cell table 41 is a table of the first characters (the leading characters) each used to spell the name of a specific facility. A symbol 51 in the root cell table indicates different characters used as the first character of a facility name and the symbol 51 in the example presented in FIG. 7 indicates that four different characters "a", "ka", "sa" and "ta" are used as the first characters. Search numbers 52 indicate the numbers of sets of substance data corresponding to the individual leading characters. As a pointer 53, a pointer to a lower-order cell table or a pointer to a substance record is entered. In the example presented in FIG. 7, a filled circle indicates a pointer to a lower-order cell table, and an unfilled circle indicates a pointer to a substance record in a substance table 46.

A cell table A42 is a table specified by the pointer attached to the symbol "a" in the root cell table 41. In this example, characters "a", "i" and "ma" follow the first character "a" and there are 11, 10 and 7 sets of substance data corresponding to the characters "a", "i" and "ma" respectively. "BLANKS" indicates that the first character is not followed by any more characters and in this example, there are three sets of substance data bearing the name "a". The start point of the corresponding substance record in the substance table is specified by the pointer appended to the "BLANKS". Higher-order cell table pointer data are also held in the "BLANKS".

A cell table B43 is a table specified by the pointer attached to the symbol "a" in the cell table 42. In this example, characters "su", "chi" and "wa" individually follow "a""a", and there are 1, 3 and 5 sets of substance data corresponding to the characters "su", "chi" and "wa" respectively. "BLANKS" indicate that the second character is not followed by anymore characters and in this example, there are two sets of substance data bearing the name "a""a". The start point of the corresponding substance record in the substance table is specified by the pointer appended to the "BLANKS".

Cell tables D45 and C44 assume similar structures. In step S22, the search is executed by using the cell tables in the search tree described above each in correspondence to one of the characters having been input.

Next, in step S23, the character having been input is sequentially compared with the first characters of the indices in the update data. As explained earlier, the update data are stored in the nonvolatile memory 12 in the data format shown in FIG. 4. The update data are stored separately from the data constituted with the search tree and the substance data (which may be referred to as the search data main body).

Figure 8:
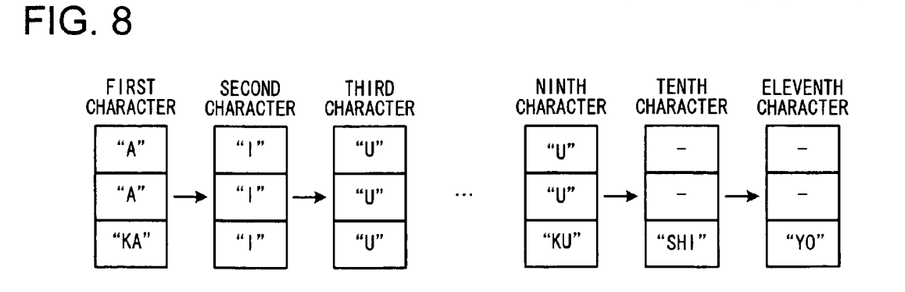
FIG. 8 shows the comparison processing through which the update data indices are compared.

FIG. 8 illustrates the index comparison processing executed to compare the indices in the update data. The example in FIG. 8 corresponds to the update data shown in FIG. 5(*c*). Each set of update data in FIG. 5(*c*) includes a non-target flag preceding the index. As the non-target flag, one of the two values, i.e., "0" indicating "target" or "1" indicating "non-target", is stored. The non-target flag is set to "1" for a set of update data judged to be non-target update data through the comparison of the individual characters starting with the first character, which is executed in step S23. Thus, the need to execute comparison processing for all the update data each time step S23 is executed is eliminated, which, in turn, improves the search efficiency and the processing speed.

In step S24, the number of search hits obtained through the processing having been executed in steps S22 and S23 is indicated at the monitor 18. In other words, the number of facilities bearing names that contain the characters having been entered so far in the right order is indicated. This number represents the sum of the number of candidates searched by using the search tree and the number of candidates hit by using the update data.

In step S25, a decision is made as to whether or not the character entry has been completed. More specifically, a decision is made as to whether or not a "search" button included in the input device 17 or the like has been operated. If it is decided that the character entry has not been completed, the operation returns to step S21 to resume the processing. If, on the other hand, the character entry is judged to have been completed, the operation proceeds to step S26.

In step S26, the substance data indicated through the search are extracted and their contents are displayed. Namely, a list of the substance record extracted through the comparison executed by using the search tree in step S22 and the update data extracted through the comparison of the indices in the update data, is displayed at the monitor 18.

The user selects one of the candidates indicated in the search results on display. More specifically, the user moves the cursor on the monitor 18 via the input device 17, sets the cursor on the desired search candidate and presses the OK button. Thus, one of the candidates indicated in the search results is selected. Through this processing, a destination, for instance, can be set by using the search data.

—Verifying Update Data—

Next, the verification of update data is explained. The availability update data is verified by selecting a "verify search data update" menu item in a menu screen or the like at the navigation apparatus 1. The user may select the "verify search data update" menu and then select the type of search data to be verified via, for instance, the input device 17. In the data type selection screen, options such as "name search data", "telephone number search data" and "street address search data" are displayed to allow the user to select one of the options as in the search data update. The data type is selected based upon the selection operation performed by the user.

Figure 9:
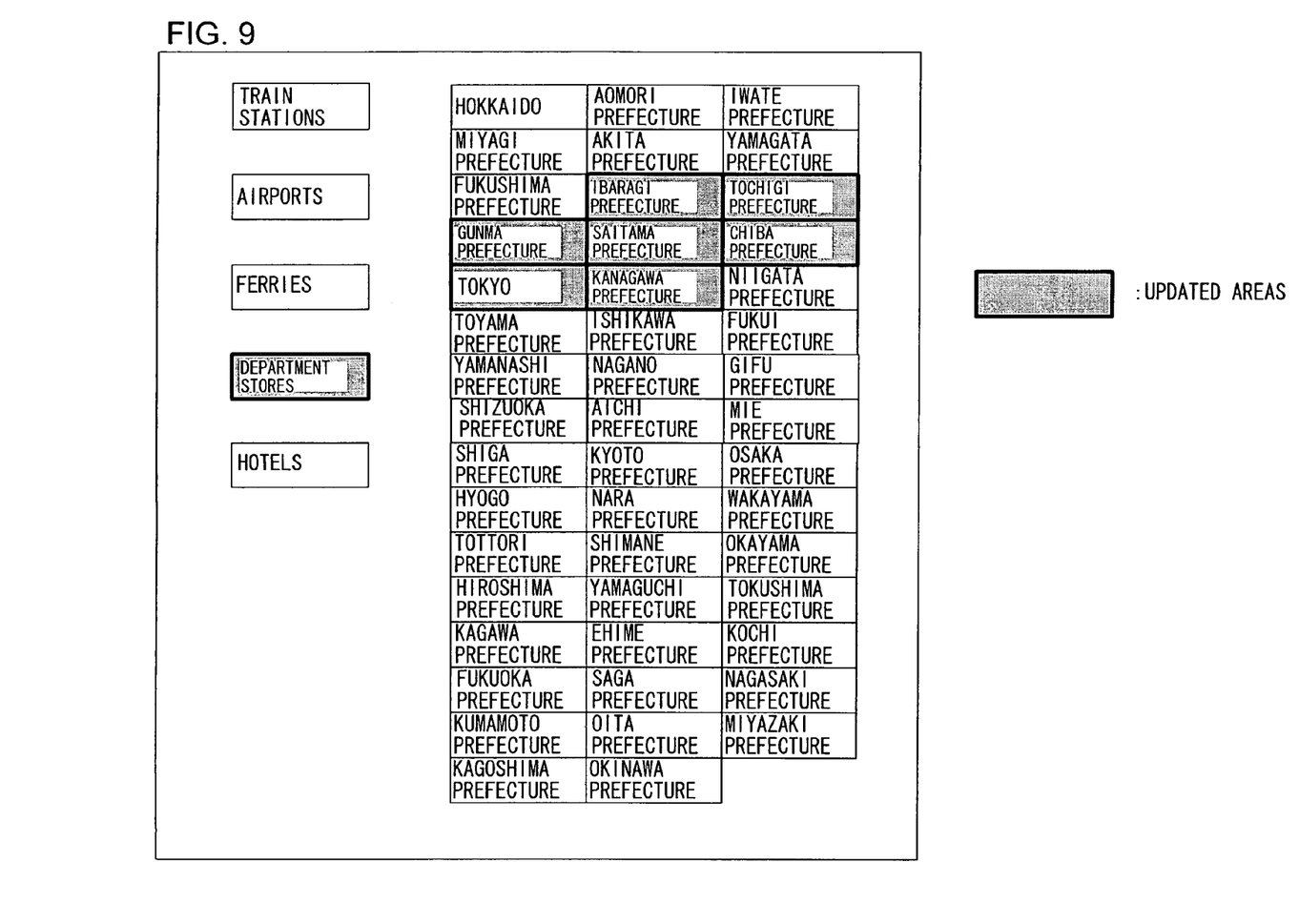
FIG. 9 shows a "name search data" verification screen.

FIG. 9 shows a verification screen for the "name search data". In the "name search data" verification screen, a category that the user wishes to check is selected via the input device 17. FIG. 9 indicates that update data are available for name search data in the highlighted category corresponding to the highlighted areas. Namely, it indicates that update data for the name search data in the category "department stores" in "Ibaragi Prefecture", "Tochigi Prefecture" and the like are stored in the nonvolatile memory 12.

Figure 10:
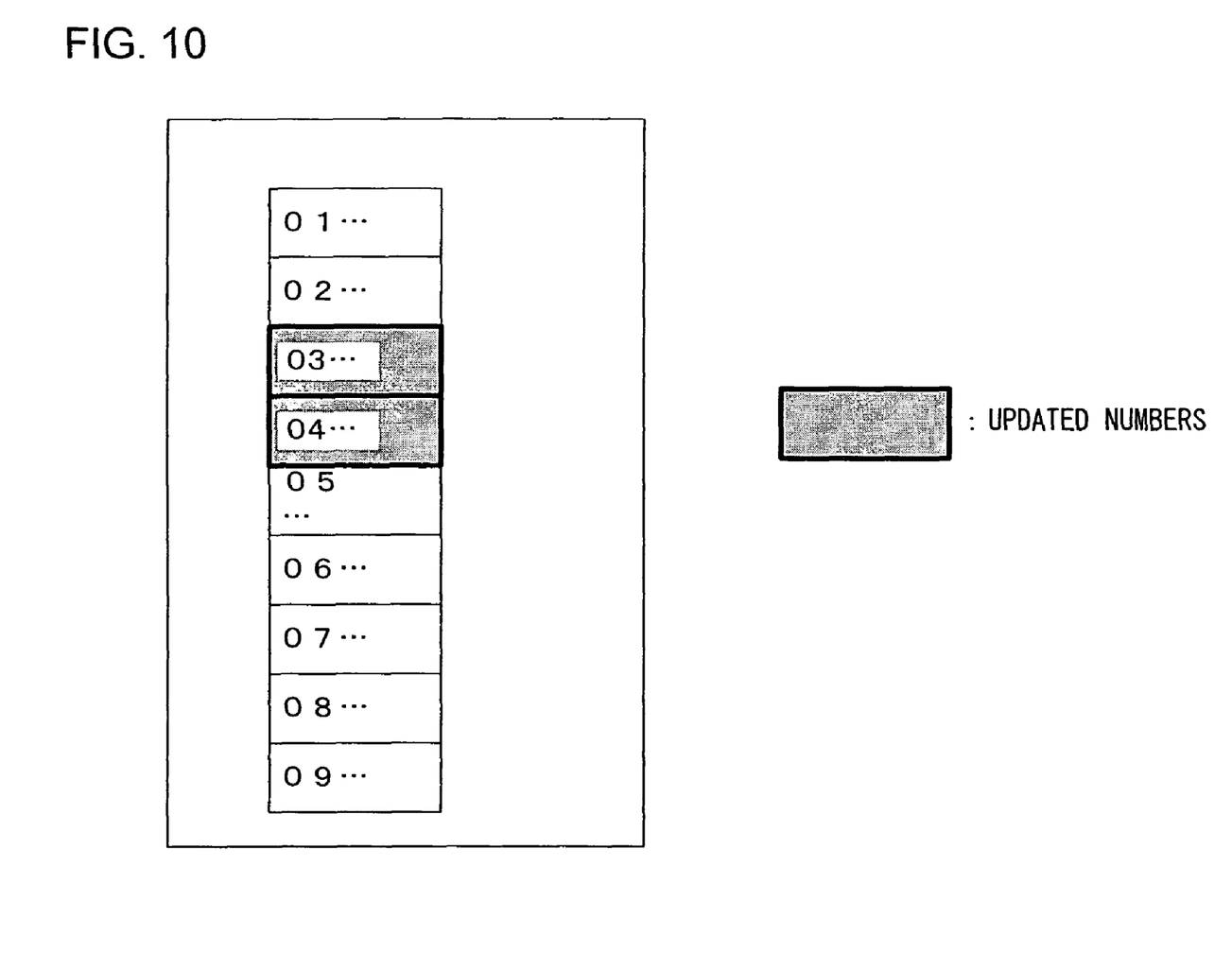
FIG. 10 shows a "telephone number search data" verification screen.

FIG. 10 shows a verification screen for the "telephone number search data". FIG. 10 indicates that update data are available for telephone number search data corresponding to telephone numbers with the first two digits thereof highlighted. Namely, it indicates that update data for the telephone number search data corresponding to the telephone numbers starting with "03" and "04" are stored in the nonvolatile memory 12.

Figure 11:
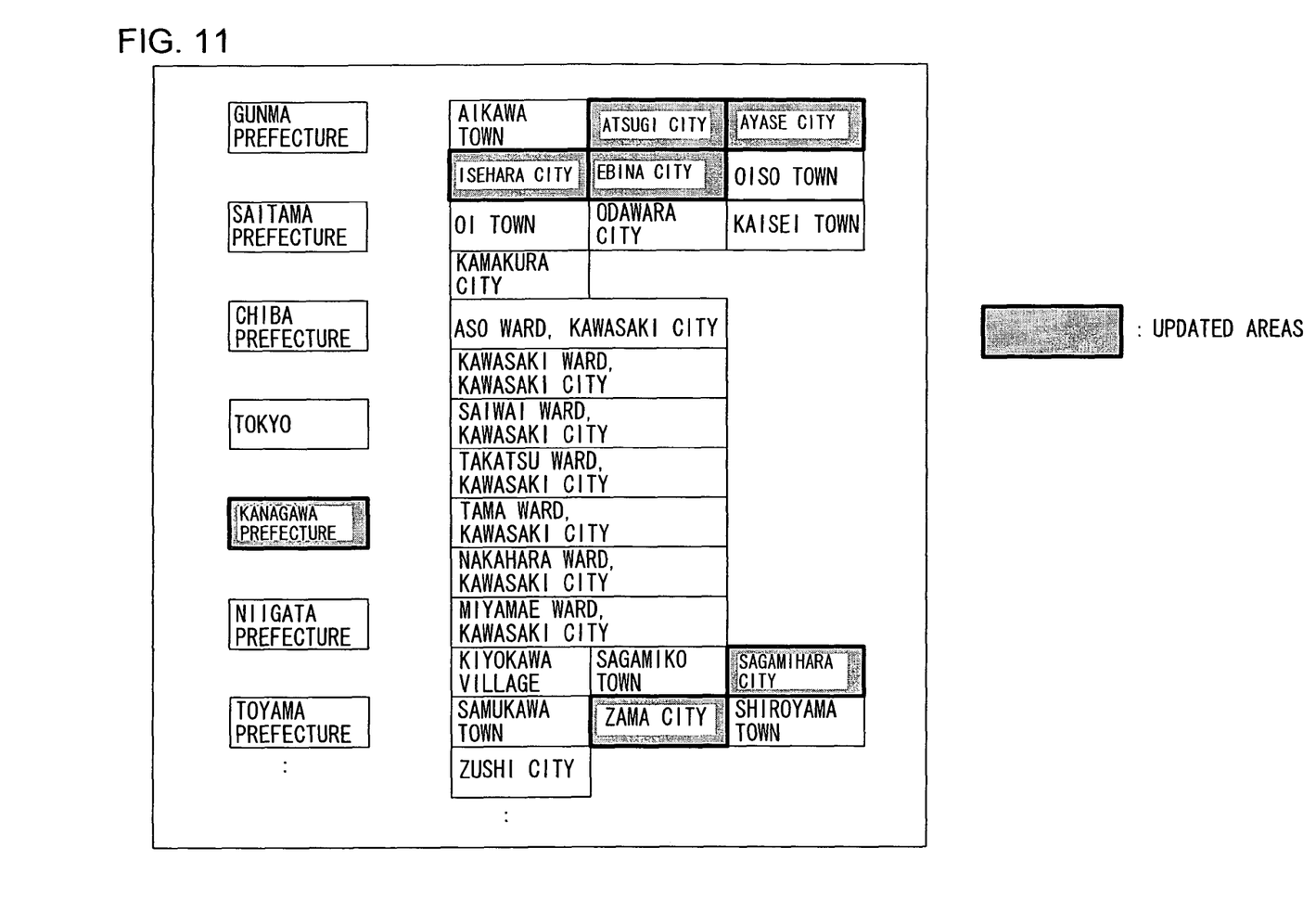
FIG. 11 shows a "street address search data" verification screen.

FIG. 11 shows a verification screen for the "street address search data". In the "street address search data" verification screen, a specific prefecture that the user wishes to check is selected via the input device 17. FIG. 11 indicates that the update data are available for street address search data in the highlighted local municipalities in the highlighted prefecture. In other words, it indicates that update data to be used to update the street address search data in "Atsugi City", "Ayase City", "Zama City" and the like in "Kanagawa Prefecture" are stored in the non-volatile memory 12.

In the embodiment, as the number of sets of update data becomes equal to or greater than a predetermined value (e.g., 1000 sets), a message prompting an update of the search data is brought up on display. For instance, a message "over 1000 sets of update data available; please update with latest version of search data" is brought up on display or this message may be provided as an audio output. In response, the user obtains the latest search data from the update recording medium 2 or via the communication device 4. The latest search data obtained in this situation are search data constituted with the latest search tree and substance data. The search data main body constituted with the latest search tree and substance data thus obtained is stored into the nonvolatile memory 12 and subsequently, the search data main body is obtained by accessing the nonvolatile memory 12 without accessing the recording medium 2 as was initially the case.

It is to be noted that as an alternative, once the number of sets of update data reaches a value equal to or greater than the predetermined value, the control device 11 at the navigation apparatus 1 may automatically connect to the data providing center 9 so as to obtain the search data constituted with the latest search tree and substance data. In addition, when the number of sets of update data becomes equal to or greater than the predetermined value, a text message "over 1000 sets of update data have accumulated; update to latest search data?" may be automatically brought up on display or such a message may be provided as an audio output automatically. As the user enters an update instruction via the input device 17 in response, the control device 11 may connect with the data providing center 9 and obtain the search data constituted with the latest search tree and substance data.

As a further alternative, whenever search data are updated at the data providing center 9, the updated search data may be automatically transmitted to the navigation apparatus 1. In this case, only the updated substance data are transmitted in the format shown in FIG. 4. Such search data resulting from the update may be transmitted only to users of the navigation apparatus 1 having signed an update data subscription contract.

The search data update system described above achieves the following advantages.

(1) When search data have been updated, only the updated substance data are transmitted together with the corresponding index, instead of updating the entire search data main body constituted with a search tree and the substance data specified based upon the search tree. Thus, the volume of the update data is minimized and at the same time, the user of the navigation apparatus is able to use the latest search data. When the update data are provided through communication in particular, the communication cost is lowered since only a small volume of data needs to be transmitted.

(2) Since the update data are stored separately from the initial search data main body in the navigation apparatus 1, data management is facilitated. In addition, only a small storage capacity needs to be allocated for the storage of the update data.

(3) As update data are accumulated as they are acquired in the navigation apparatus 1, the most recent version of search data is held at the navigation apparatus 1 at all times. In addition, since the search is executed by using both the initial search data main body and the update data, the search is executed based upon the latest search data.

(4) Since the user is able to specify a specific area for an update, only the minimum volume of update data needed for the update can be obtained, which minimizes the labor, the time and the cost for the required update data acquisition. In addition, since the update range can be specified in a visual display, the operability is improved.

(5) At the data providing center 9, the newest version of data held at the navigation apparatus 1 is ascertained and update data are transmitted from the data providing center only if data more recently compiled are available. As a result, transmission of redundant update data is prevented.

(6) The update data are first sorted and then stored into the nonvolatile memory 12. As a result, the search efficiency and the search speed are both improved.

(7) A flag identifying non-target update data is set after a given set of update data is judged to be non-target update data following the single-character comparison. Thus, the search deficiency and the processing speed are both improved.

(8) Since the initial search data main body and the update data are both held, an older version of search data can be referenced with ease.

While an explanation is given above in reference to the embodiment on an example in which the navigation apparatus 1 and the data providing center 9 are connected via the telephone line network 5, the present invention is not limited to this example and the navigation apparatus and the data providing center may instead be connected via the Internet or another dedicated line.

While an explanation is given above in reference to the embodiment on an example in which the DVD drive device 14 is installed in the navigation apparatus 1, the present invention is not limited to this example. The navigation apparatus 1 may only include the nonvolatile memory 12 such as a hard disk and may obtain map data and search data entirely through communication. Alternatively, the navigation apparatus 1 may include an IC card slot so as to receive update data to be used to update the search data via a removable memory such as an IC card.

While an explanation is given in reference to the embodiment on an example in which the present invention is adopted in the navigation apparatus installed in a vehicle, the present invention is not limited to this example and it may be adopted in a portable navigation apparatus.

While information indicating the data version, the update date, the data creation date and the like is provided as the version information in the embodiment described above, the present invention is not limited to this example. The version information may instead be constituted with a string of numerals, a string of alphabetical characters or a combination of numerals and characters. Namely, any type of information may be used as the version information as long as it enables the identification of the data version. It is to be noted that any such information is referred to as the version information in this description.

While an explanation is given above in reference to the embodiment on an example in which the programs executed in the navigation apparatus 1 and the server 6 are preinstalled in the individual apparatuses, the present invention is not limited to this example. For instance, the programs may be provided in recording media such as DVDs or CD-ROMs. In such a case, the navigation apparatus and the server will each need to include a device capable of reading data from the recording medium. Alternatively, the programs may be provided via transmission media such as a communication line, a typical example of which is the Internet. In other words, the programs, converted to signals on carrier waves that transmit through transmission media, may be provided through transmission. Furthermore, the navigation apparatus 1 in the data update system shown in FIG. 1 may receive the necessary program from the server 6.

While an explanation is given above in reference to the embodiment on an example in which the present invention is adopted in a dedicated navigation apparatus exclusively used in a vehicle, the present invention is not limited to this example and the control program for the navigation apparatus 1 described earlier may be executed on a personal computer to enable the personal computer to function as a navigation apparatus. Under such circumstances, the current position detection device 13 and the like should be connected to specific I/O ports or the like of the personal computer.

Figure 12:
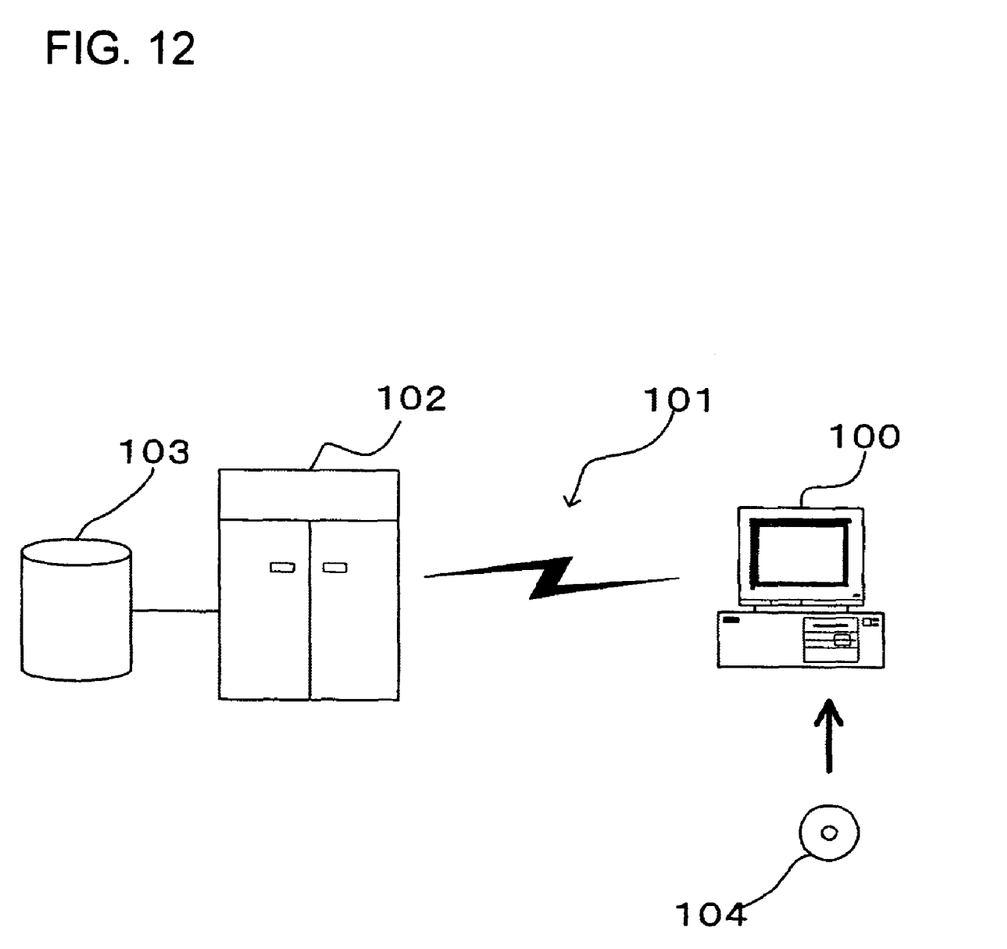

FIG. 12 shows how the program may be provided to a personal computer 100 in a recording medium such as a CD-ROM or through a data signal on the Internet or the like. While reference numeral 100 indicates a personal computer, the program may be provided to the navigation apparatus 1 or the server 6 in a similar manner. The personal computer 100 acquires the program via a CD-ROM 104. The personal computer 100 is also capable of connecting with a communication line 101. A computer 102 is a server computer that provides the program stored in a recording medium such as a hard disk 103. The communication line 101 may be a communication network for Internet communication, personal computer communication or the like or it may be a dedicated communication line. The computer 102 reads out the program from the hard disk 103 and transmits the program to the personal computer 100 via the communication line 101. Namely, the program embodied as a data signal on a carrier wave is transmitted via the communication line 101. Thus, the program can be distributed as a computer-readable computer program product adopting any of various modes including a recording medium and a carrier wave.

While an explanation is given above in reference to the embodiment on an example in which the search data include name search data, telephone number search data and street address search data, the present invention is not limited to this example and the search data may be another type of search data. Namely, the search data may assume any form as long as they are used to specify positions.

In the embodiment described above, the searched substance data are extracted and their contents are displayed in step S26 in FIG. 6. At this time, a substance record extracted through the comparison executed by using the search tree and the update data extracted through the comparison of the indices in the update data may both be extracted and displayed at the monitor 18. In such a case, only the substance data in the update data may be brought up on display if the substance data in the extracted substance record and the substance data in the update data match. It is to be noted that since the update data are used to update the older version of the substance data, the substance data in the substance record and the substance data in the update data are not completely identical. Accordingly, the substance data in the extracted substance record and the substance data in the update data should be considered to match if they can be regarded to be a substantial match. For instance, they may be considered to match if two or more (a plurality of) types of information among the name information, the street address information, the telephone number information and the position information match, or they may be considered to match if a substantial match (e.g., 80% or higher) is achieved among the various types of data.

While the symbols (see FIG. 7) in the name search data and the indices (see FIGS. 4 and 5) in the update data are constituted with Japanese alphabetical characters in the embodiment, the present invention is not limited to this example and the symbols and the indices may instead be constituted with English or German alphabetical characters. Furthermore, they may be constituted with alphabetical characters used in another language as well. In other words, they may be constituted with characters based upon which phonetics of the language spoken in a given country are indicated. If the symbols and the indices are constituted with English alphabetical characters, "a", "i" , "u" and the like in the embodiment should be replaced with "a", "b" and "c" and the like. For instance, "aiuoo seizou (aiuoo manufacturing)" in FIG. 5(a) may be replaced with "abcee manufacturing", and "aiueo seizo (aiueo manufacturing)" and "kaiueo seisakusho (kaiueo production)" in FIG. 5(b) should be replaced respectively with "abcde manufacturing" and "fbcde production".

While the invention has been particularly shown and described with respect to a preferred embodiment and variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:
Japanese Patent Application No. 2004-012034, filed Jan. 20, 2004.

The invention claimed is:

1. An update method performed by a server and a control device of a navigation apparatus for updating search data used in the navigation apparatus, the update method comprising:
providing, by the server, initial search data comprising search tree data having a tree structure and a plurality of sets of initial substance data specified based upon the search tree data, wherein the initial substance data include facility information;
providing, by the server, update search data comprising a set of update substance data separately from the initial search data without updating a set of the initial substance data in the initial search data or adding a set of initial substance data to the initial search data, wherein the update substance data are provided without any search tree data, have a non-tree index as a search key that does not require any search tree data, and include facility information; and
executing, by the control device, a substance data search by using a tree-based search based on the search tree data of the initial search data and an index-based search using the non-tree index of the update substance data, wherein
upon obtaining the update search data from the server, the navigation apparatus stores the obtained update search data into a storage device separately from the initial search data;
the control device of the navigation apparatus transmits, to the server, information indicating a range of search data to be updated;
if update search data are available over the range of search data to be updated indicated in the received information, the server provides the update search data over the range to the navigation apparatus; and
in correspondence to each character entered via an input device of the navigation apparatus with which a search key can be entered one character at a time, a search executed by using the search tree data is advanced, the character is compared with the non-tree index, which is contained in each of a plurality of sets of update search data stored in the storage device, and a non-target flag is added to each set of update search data which has been determined not to be a search target based upon comparison results, wherein the non-target flag indicates that each set of update search data that includes the non-target flag is not to be compared in a subsequent index-based search.

2. The update method performed by a server and a control device of a navigation apparatus for updating search data used in the navigation apparatus according to claim 1, further comprising:
storing, by the control device, the update substance data having the non-tree index as the update data in the navigation apparatus separately from the initial search data.

3. A search data update system, comprising:
a navigation apparatus that uses search data; and
a search data providing apparatus that provides update search data to the navigation apparatus to be used to update initial search data, wherein:
the navigation apparatus includes a storage device at which the initial search data constituted with search tree data having a tree structure and a plurality of sets of initial substance data each specified based upon the search tree data are stored, and an update data obtaining device that obtains the update search data from the search data providing apparatus, wherein the initial substance data include facility information;
the update search data are provided in units of individual sets of update substance data, wherein the update substance data are provided without any search tree data, include attached thereto a non-tree index as a search key information to be used without any search tree data in a search in correspondence to each set of update substance data, and include facility information;
upon obtaining the update search data from the search data providing apparatus, the update data obtaining device stores the obtained update search data into the storage device separately from the initial search data;

the navigation apparatus further includes a search device that executes a substance data search by using the search tree data of the initial search data stored in the storage device to execute a tree-based search and using the non-tree index attached to each set of update substance data of the update search data stored in the storage device to conduct an index-based search, in correspondence to input of a character for search;

the update data obtaining device of the navigation apparatus transmits, to the search data providing apparatus, information indicating a range of search data to be updated;

if update search data are available over the range of search data to be updated indicated in the received information, the search data providing apparatus provides the update search data over the range to the navigation apparatus;

the navigation apparatus further includes an input device with which a search key can be entered one character at a time; and in correspondence to each character entered via the input device, the search device advances a search executed by using the search tree data, compares the character with the non-tree index, which is contained in each of a plurality of sets of update search data stored in the storage device, and adds a non-target flag to each set of update search data which has been determined not to be a search target based upon comparison results, wherein the non-target flag indicates that each set of update search data that includes the non-target flag is not to be compared in as subsequent index-based search.

4. The search data update system according to claim 3, wherein:

upon obtaining new update search data, the update data obtaining device in the navigation apparatus sorts entire update search data including the new update search data and the update search data already stored in the storage device based upon the non-tree index and stores the sorted update search data in the storage device.

5. The search data update system according to claim 3, wherein:

the navigation apparatus further includes a control device that executes navigation processing including route search and route guidance by using the initial or update substance data obtained via the search device.

6. The search data update system according to claim 3, wherein:

once a number of sets of update search data having been obtained becomes equal to or greater than a predetermined value, the update data obtaining device in the navigation apparatus provides an audio output or a display output notifying that the number of sets of update search data is equal to or greater than the predetermined value.

7. The search data update system according to claim 3, wherein:

once a number of sets of update search data having been obtained becomes equal to or greater than a predetermined value, the update data obtaining device in the navigation apparatus obtains a new version of initial search data comprising new search tree data and a new plurality of sets of initial substance data containing update substance data in the update search data, each specified based upon the new search tree data, and stores the new version of initial search data thus obtained into the storage device.

8. The search data update system according to claim 3, wherein:

the update data obtaining device in the navigation apparatus transmits, to the search data providing apparatus, information related to a version of the update search data stored in the storage device; and if a newer version of update substance data than the version indicated in the received information is available, the search data providing apparatus provides the update search data corresponding to the newer version of the update substance data to the navigation apparatus.

9. A navigation apparatus in the search data update system according to claim 3.

10. A search data providing apparatus in the search data update system according to claim 3.

11. A navigation apparatus capable of updating search data comprising:

a first storage unit at which initial search data comprising search tree data having a tree structure and a plurality of sets of initial substance data each specified based upon the search tree data are stored, wherein the initial substance data include facility information;

an update data obtaining device to obtain update search data comprising a set of update substance data from a search data providing apparatus, wherein the update substance data are provided without any search tree data, include facility information, and have a non-tree index as a search key that does not require any search tree data;

a second storage unit at which the update search data obtained by the update data obtaining device are stored separately from the initial search data;

a search device that executes a substance data search by using the search tree data of the initial search data stored in the first storage unit to execute a tree-based search and the non-tree index attached to each set of update substance data of the update search data stored in the second storage unit to execute an index-based search; and an input device with which a search key can be entered one character at a time, wherein the update data obtaining device transmits, to the search data providing apparatus, information indicating a range of search data to be updated;

the update data obtaining device obtains update search data over the range of search data from the search data providing apparatus, if the update search data are available over the range of search data; and in correspondence to each character entered via the input device, the search device advances a search executed by using the search tree data, compares the character with the non-tree index, which is contained in each of a plurality of sets of update search data stored in the second storage unit, and adds a non-target flag to each set of update search data which has been determined not to be a search target based upon comparison results, wherein the non-target flag indicates that each set of update search data that includes the non-target flag is not to be compared in a subsequent index-based search.

* * * * *